United States Patent Office 2,894,509
Patented July 14, 1959

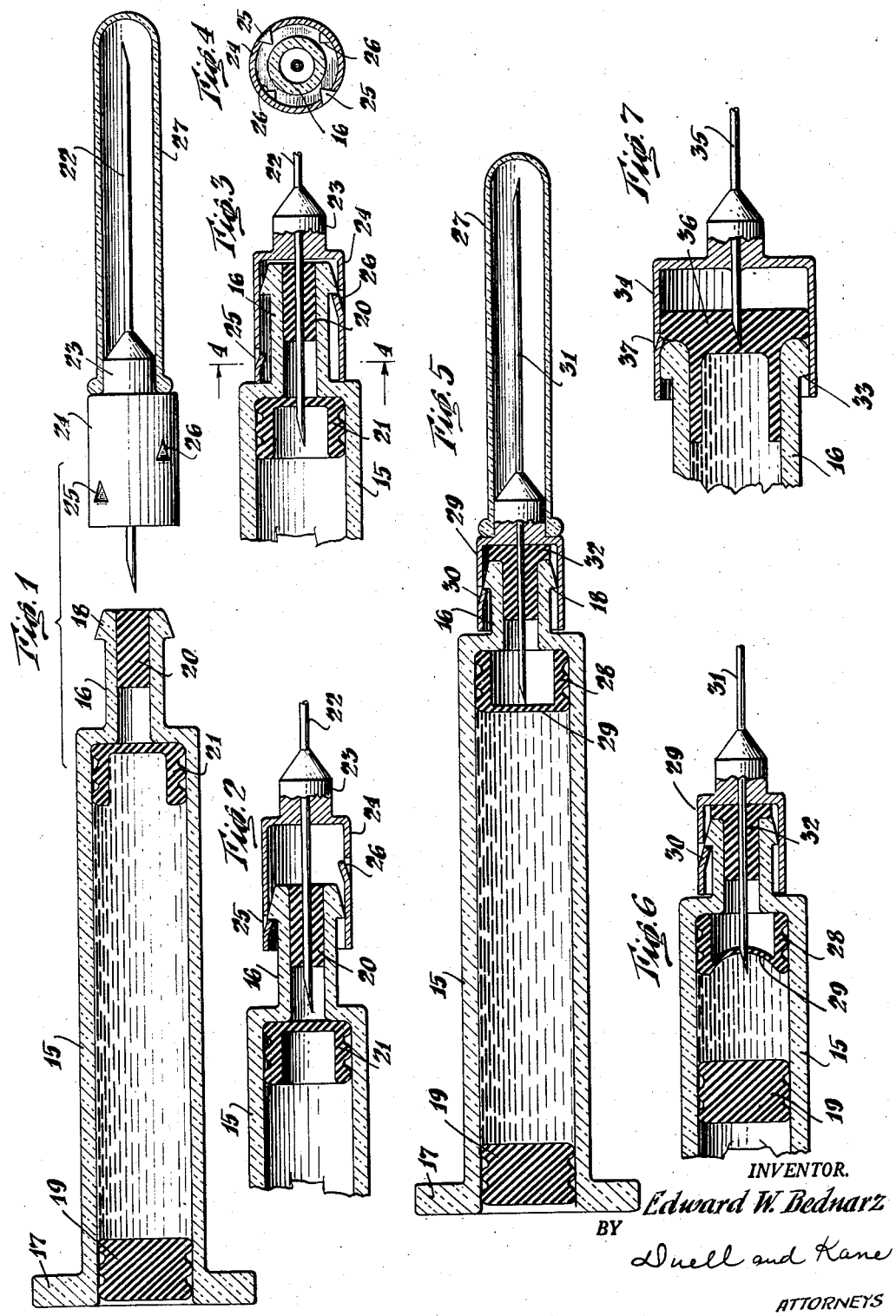

2,894,509
HYPODERMIC SYRINGE

Edward W. Bednarz, Rutherford, N.J., assignor to Becton, Dickinson and Company, Rutherford, N.J., a corporation of New Jersey Application January 18, 1952, Serial No. 267,043

19 Claims. (Cl. 128—218)

This invention relates to a structurally and functionally improved hypodermic syring assembly; the present application being a continuation-in-part of the prior application for United States Letters Patent in the names of Edward W. Bednarz and Frank E. Brown on "Syringe Assembly" filed in the Patent Office on August 2, 1951 and identified under Serial No. 239,966 and now abandoned.

It is an object of the invention to provide a mechanism of this type by means of which the needle may be maintained in uncontaminated condition so that at the time of injection it will be unnecessary to sterilize the parts.

A further object is that of furnishing an injection apparatus which is primarily intended for a "one time" use after which it may be thrown away; the parts being susceptible to ready manipulation in order to render the unit operative immediately prior to the time when an injection is to be made.

Still another object is that of providing a hypodermic syringe assembly which will include relatively few parts each individually simple and rugged in construction, such parts being capable of ready grouping by relatively unskilled labor so that an apparatus is produced which may be economically manufactured.

With these and other objects in mind reference is had to the attached sheets of drawings illustrating practical embodiments of the invention and in which:

Fig. 1 is a sectional side view of the assembly with certain of the parts separated from each other;

Fig. 2 is a fragmentary sectional side view showing the parts of the mechanism in initially associated positions;

Fig. 3 is a view similar to Fig. 2 but illustrating the final association of the parts;

Fig. 4 is a transverse sectional view taken along the line 4—4 and in the direction of the arrows as indicated in Fig. 3;

Fig. 5 is a sectional side view of an alternative form of assembly;

Fig. 6 is a fragmentary sectional side view of the parts as illustrated in Fig. 5 but showing the latter in the positions which they assume during the injection stroke;

Fig. 7 is a view similar to Fig. 2 and illustrating a further form of structure;

Referring primarily to the structures shown in Figures 1 to 4 inclusive, the numeral 15 indicates the barrel of the syringe which as illustrated is in the form of an ampule to contain liquid medicament. In order to reduce unnecessary illustration this barrel-ampule embraces only a single compartment. It is apparent that this need not be the case and that any desired incidental structure might be embodied in the wall of the ampule or otherwise in order to have, for example, solid medicament (powder, tablet, granules, or otherwise) and diluent mixable immediately prior to the injection operation. In any event the barrel 15 is preferably formed of glass and may have adjacent its forward end a neck or tip portion 16 and adjacent its rear end a flange 17 of suitable configuration. In the embodiment under consideration the outer end of neck 16 may be formed with a detent portion 18 embodying a rearwardly and outwardly inclined surface terminating in a shoulder.

At the rear end of the barrel bore a piston type stopper 19 may be mounted. Adjacent the forward barrel end a perforable diaphragm type of closure 21 is disposed. The bore of neck 16 may be sealed by any desired material such as a plug of rubber 20. A piston projector conveniently includes a rod or stem (not shown) capable of engaging or being connected with stopper 19 in order to shift the latter through the barrel bore toward the reduced bore of neck 16 and thus effect an expulsion of medicament through the bore of that neck if the latter be suitably vented.

To provide for such venting a double-ended needle 22 is employed. This cannula has permanently secured to it a hub preferably formed of metal and including a tip portion 23 as well as a substantially rigid cup-shaped portion 24 having a diameter such that the neck 16 and its detent 18 may be received within the bore thereof. The hub portion 24 is provided with any desired number of inwardly extending pawl portions 25 adjacent its rear edge. It is likewise provided with inwardly extending pawl portions 26 at a point spaced inwardly or axially from the portions 25. These together with the detent provide a latch structure. With the exception of these portions and any inwardly extending needle end, the hub is unobstructed. Conveniently the part 23 mounts a cover 27 of any suitable material and by means of which the cannula 22 will be maintained in sterile condition at points forwardly of the hub.

To maintain the needle in a sterile condition at points rearwardly of the hub, its inner end is passed through the plug 20 until the pawls 25 engage with the detent portion 18 as shown in Fig. 2. Under those circumstances, the inner end of the needle occupies the space between the perforable seals furnished by the diaphragm or stopper 21 and the plug 20. It is thus protected from contamination. With such a structure it is apparent that the ampule-barrel may be filled with medicament and the needle assemlby associated therewith so that the parts will remain in sterile condition for indefinite periods of time and until they are ready for use.

When it is desired to use the device all that an operator will have to do is to grasp the tube or hub 24 and move the same to the left or rearwardly. Under such circumstances it will be telescoped, without difficulty to a greater extent over neck portion 16. Accordingly, as shown in Fig. 3 the pawls 25 will move towards the body of the ampule 15 and away from the detent portion 18. Pawls 26 will ride over this detent portion and latch behind the same to assume the position shown in Fig. 3. In that position the rear end of the cannula extends through the diaphragm part of closure or seal 21 and is in communication with the interior of the ampule.

The parts are supported against movements with respect to each other and in fact, it will be impracticable to detach the needle assembly from the barrel. In this connection as shown in Fig. 4, two pawl portions are included in each of the axially spaced series 25 and 26. It will be apparent that any desired number of such portions might be incorporated in the unit. The site of injection having been determined, surface sterilization may be resorted to and the pointed outer end of the needle 22 caused to pierce the epidermis to the desired depth. Thereafter, by any suitable structure, piston stopper 19 is projected through the barrel bore and the injection completed.

In the form of apparatus shown in Figs. 5 and 6, an assembly which is in many respects a duplicate of that heretofore described, has been illustrated. Therefore, wherever practicable the same reference numerals have been employed to designate identical parts. However, in these latter views it will be noted that in lieu of the closure 21, which is perforated by the inner end of the cannula, a closure 28 has been employed which has an inwardly extending diaphragm portion 29. Normally as shown, the closure element 28 defines a space adequate for the reception of the inner needle end. However, when stopper or piston 19 is projected, then diaphragm portion 29 flexes inwardly, so that the needle pierces the seal provided by the diaphragm portion and is placed in communication with the interior of the medicament-containing space of the barrel bore.

Under these circumstances the hub or sleeve portion of the needle assembly need only include a latch means embracing a single series of pawl elements. This will be because the needle assembly will be initially disposed in fully seated position. Therefore, as shown, the tubular portion 29 extending rearwardly from the forward portion of the hub assembly is merely provided with a single set of pawls 30 to cooperate with the detent portion 18. If desired and as shown in lieu of the plug 20 as described in the earlier figures, a plug 32 provided with a head portion may be employed and through which the body 31 of the needle extends. It will be apparent that in this form of apparatus and as shown in Fig. 6 the instant projection of piston 19 is resorted to, the liquid within the barrel will cause a flexing of the diaphragm to establish communication with the bore of the cannula. This communication will be maintained under the continuance of pressure against stopper 19 as the latter moves axially of the barrel bore.

It is of course obvious that a reversal of the structure as shown in Figures 1 to 4 might be restored to. This has been illustrated in Fig. 7 in which the reference numeral 16 again illustrates the neck portion of the barrel-ampule. In this instance the latter may terminate in a lip portion 33 of modified outline in comparison with detent portion 18. A tube or sleeve 34 forms a part of the hub assembly of needle 35. A headed perforable stopper 36 may seal the outer end of the ampule and embrace in its head a thickness such that the inner end of the cannula will be initially imbedded therein. Only a single series of pawls 37 are included in the sleeve 34. The internal diameter of the latter should be slightly in excess of the external diameter of bead 33 and the head of closure 36.

It follows that the needle assembly may be disposed so that the inner end of the needle is imbedded within the material of the head portion of closure 36 as shown in Fig. 7. So imbedded it will be maintained free from contamination for indefinite periods of time. The pawl or latch portion 37 will bear against the rear or inner edge of closure 36. Under these circumstances the entire assembly is maintained until it is desired to use the syringe. At that time an operator by simply pressing rearwardly against the needle assembly will cause the pawl portion or portions 37 to ride over the lip 33 and to assume a position at which they bear against the rear edge or shoulder of the latter. So disposed it is apparent that a detachment of the needle assembly from the syringe barrel is prevented. Likewise it will be apparent that the inner end of needle 35 will have moved through the material of the stopper 36 so that it extends inwardly of the head of the latter and is in communication with the interior of the barrel.

Thus, among others, the several objects of the invention as afore noted are achieved. Obviously numerous changes in construction and rearrangement of the parts may be resorted to without departing from the spirit of the invention as defined by the claims.

I claim:

1. A syringe assembly including in combination a barrel, a seal disposed adjacent one end of said barrel, a second seal within the bore of said barrel and spaced from said first named seal, a hollow double-ended needle, means for supporting said needle upon said barrel and with one end extending through and beyond said first named seal to a point short of said second seal, a detent and pawl structure forming parts of said barrel and needle, supporting means to prevent movement of said detent and pawl with respect to each other in one direction only and said supporting means being movable with respect to said barrel in an opposite direction whereby said pawl and detent structure may be caused to cooperate to retain said needle with its end extending through said second seal.

2. A syringe assembly including in combination a barrel, a seal disposed adjacent one end of said barrel, a second seal within the bore of said barrel and spaced from said first named seal, a hollow double-ended needle assembly, means for supporting said needle assembly upon said barrel and with one end of the needle thereof extending through and beyond said first named seal to a point short of said second seal and detent means forming a part of said barrel and needle assembly acting solely in a single direction to lock said needle against separation from said barrel.

3. A hypodermic syringe including in combination a barrel, a bored neck portion extending from one end of said barrel, a needle having an outer end, a hub assembly associated with said needle, said assembly being slidable with respect to the neck portion, pawls associated with said assembly and axially spaced with respect to each other, a single detent means fixed with respect to and extending from said neck portion to be selectively engaged by one and then the other of said pawls and the pawl nearest the outer needle end permanently locking said hub against movement with respect to said neck upon engaging with the detent means of the neck.

4. A hypodermic syringe including in combination a barrel through the bore of which medicament is dischargeable, said barrel presenting an outer end portion which is also formed with a bore, a plug disposed within the bore of said end portion, a needle, a hub assembly attached to said needle with the ends of the latter extending to each side of the point of attachment with said assembly, such assembly being shiftably mounted upon said end portion with one needle part extending into the material of said plug, cooperative latch means associated with said end portion and said assembly to lock said one needle end against removal from said plug and further latch means operative upon said assembly being shifted with respect to said end portion to retain such parts against further movement with said one needle end in communication with the barrel bore.

5. A hypodermic syringe including in combination a barrel through the bore of which medicament is dischargeable, said barrel presenting an outer end portion which is also formed with a bore, a plug disposed within the bore of said end portion, a needle, a hub assembly attached to said needle with the ends of the latter extending to each side of the point of attachment with said assembly, such assembly being shiftably mounted upon said end portion with one needle part extending into the material of said plug, cooperative latch means associated with said end portion and said assembly to lock said one needle end against removal from said plug, a closure disposed within said barrel bore adjacent the end portion of the latter and out of contact with the adjacent needle end and further latch means operative upon said assembly being shifted with respect to said end portion to retain such parts against further relative movements with said one needle end extending through said closure in communication with the barrel bore beyond the same.

6. A hypodermic syringe including in combination a barrel through the bore of which medicament is dischargeable, said barrel presenting an outer end portion which is also formed with a bore, a plug disposed within the bore of said end portion, a needle, a hub assembly attached to said needle with the ends of the latter extending to each side of the point of attachment with said assembly, such assembly being shiftably mounted upon said end portion with one needle part extending into the material of said plug, a pair of locking pawls carried by said assembly and axailly spaced from each other, detent means associated with said outer end portion, one of said pawls engaging said detent means to lock said one needle end against removal from said plug and the second pawl cooperating with said detent means upon said assembly being shifted with respect to said end portion to retain such parts against further movement with said one needle end in communication with the barrel bore.

7. A hypodermic syringe comprising a barrel having an external circumferential circular groove adjacent one end portion, a plunger in said barrel, a closure member in said one end portion, a connector member having retaining means at one end engaging the outer end of said closure member and retaining means engaging in said groove and holding said connector member fixed on said barrel, and a hypodermic needle extending through said closure member and outwardly beyond said connector member and permanently fixed to one of said members.

8. A hypodermic syringe comprising a barrel having an external circumferential circular groove adjacent one end portion, a plunger in said barrel, a closure member at said one end portion, a connector member having retaining means at one end engaging the outer end of said closure member and retaining means engaging in said groove and holding said connector member fixed on said barrel, and a hypodermic needle extending through said closure member and outwardly beyond said connector member and permanently fixed to said connector member.

9. A hypodermic syringe including in combination a barrel having an end presenting a bore, a needle body having a pointed outer end, a substantially rigid hub permanently mounting said needle, a detent structure including a pair of parts carried by said hub and the exterior of said barrel respectively, said hub slidably enclosing said barrel end and said parts overriding each other in response solely to a projection of said barrel into said hub to permanently lock the elements of the assembly against separation, the element and surfaces being proportioned to maintain the lumen of the needle adjacent its inner end free from a position within the interior of said barrel prior to a locking action occurring.

10. In a hypodermic syringe as defined in claim 9, a seal supported by said barrel adjacent its end to prevent communication between the barrel interior and the lumen of the needle prior to a locking action occurring and the inner needle end pentrating such seal simultaneously with the locking action to establish such communication.

11. A hypodermic syringe including in combination a barrel having an end presenting a bore, a needle body having a pointed outer end, a substantially rigid hub permanently mounting said needle, a detent structure including a pair of parts carried by said hub and the exterior of said barrel respectively, said hub slidably enclosing said barrel end and said parts overriding each other in response solely to a projection of said barrel into said hub to permanently lock the elements of the assembly against separation, and a further part also included in said detent structure and cooperating with one of said pair of parts to retain said hub against detachment from said barrel end prior to the permanent locking of the elements.

12. A hypodermic syringe including in combination a barrel having an end presenting a bore, a needle body having a pointed outer end, a substantially rigid hub permanently mounting said needle, a detent structure including a pair of parts carried by said hub and the exterior of said barrel respectively, said hub slidably enclosing said barrel end and said parts overriding each other in response solely to a projection of said barrel into said hub to permanently lock the elements of the assembly against separation, the detent structure carried by said hub comprising a pair of inwardly projecting pawls having their free ends extending in the direction of the outer end of the needle.

13. For use with a syringe having a bored barrel end provided with a detent in its outer face, a hypodermic needle assembly comprising a hollow hub of substantially rigid material, a needle permanently affixed thereto, said hub receiving the tip of a syringe, detent means carried by said hub to override the detent of a barrel and engage surfaces thereof to permanently lock said needle assembly against detachment from said barrel, said hub being cup-shaped and presenting an uninterrupted rim portion and the detent means carried thereby extending from the inner face of the cup wall in the direction of the needle axis.

14. In a needle assembly as defined in claim 13, said detent means comprising a pair of elements axially spaced from each other along the cup wall.

15. In a needle assembly as defined in claim 13, said detent means comprising a pawl integral with the hub and yieldingly movable with respect thereto.

16. A hypodermic syringe including in combination a barrel having an end presenting a bore, a needle body having a pointed outer end, a substantially rigid hub permanently mounting said needle, a detent structure including a pair of parts carried by said hub and the exterior of said barrel respectively, said hub slidably enclosing said barrel end and said parts overriding each other in response solely to a projection of said barrel into said hub to permanently lock the elements of the assembly against separation, a seal supported by said barrel to prevent communication between the interior of the latter and the lumen of the needle prior to a locking action occurring, such seal being disposed at a point short of the barrel end, and a further seal at that end through which said needle slidably extends.

17. A hypodermic syringe including in combination a syringe barrel having an outer end, a detent part extending outwardly from such end, a substantially rigid cup-shaped hub slidably enclosing such end, a needle cannula permanently secured to said hub and a pawl forming a part of said hub and movable with respect to the same— as said hub is slid inwardy relative to said barrel—to override and lock against said detent part to permanently secure said hub against subsequent removal from said barrel.

18. In a hypodermic syringe as defined in claim 17, said needle cannula extending inwardly of the hub bore, means carried by said syringe barrel adjacent its outer end to obstruct communication with its bore and the inner end of said needle penetrating said obstruction as said hub is thus slid inwardly.

19. For use with a syringe barrel, a needle assembly, such assembly comprising a cup-shaped, substantially rigid hub, a hypodermic needle permanently affixed to the base of said hub and a pawl formed in the side wall of said hub and extending inwardly therefrom into the cup bore in the direction of the base of the latter.

References Cited in the file of this patent

UNITED STATES PATENTS

| Number | Name | Date |
|---|---|---|
| 654,533 | Garner | July 24, 1900 |
| 766,203 | Walsh | Aug. 2, 1904 |
| 791,802 | De Lisle | June 6, 1905 |
| 1,308,919 | Sellar | July 8, 1919 |
| 1,522,198 | Marcy | Jan. 6, 1925 |
| 1,529,659 | Marcy | Mar. 17, 1925 |
| 1,591,761 | Haines | July 6, 1926 |
| 1,667,273 | Stewart | Apr. 24, 1928 |
| 1,738,146 | Kulik | Dec. 3, 1929 |
| 1,757,680 | Neil | May 6, 1930 |
| 1,961,490 | Hein | June 5, 1934 |
| 2,102,704 | Hein | Dec. 21, 1937 |
| 2,460,039 | Scherer et al. | Jan. 25, 1949 |
| 2,473,733 | Smith | June 21, 1949 |
| 2,531,893 | Roehr | Nov. 28, 1950 |
| 2,545,017 | Billingsley | Mar. 13, 1951 |
| 2,562,129 | Scherer et al. | July 24, 1951 |